Nov. 11, 1941.  G. DEN BESTEN  2,262,452
SAFETY RELEASE HITCH
Filed Sept. 9, 1939  4 Sheets-Sheet 1
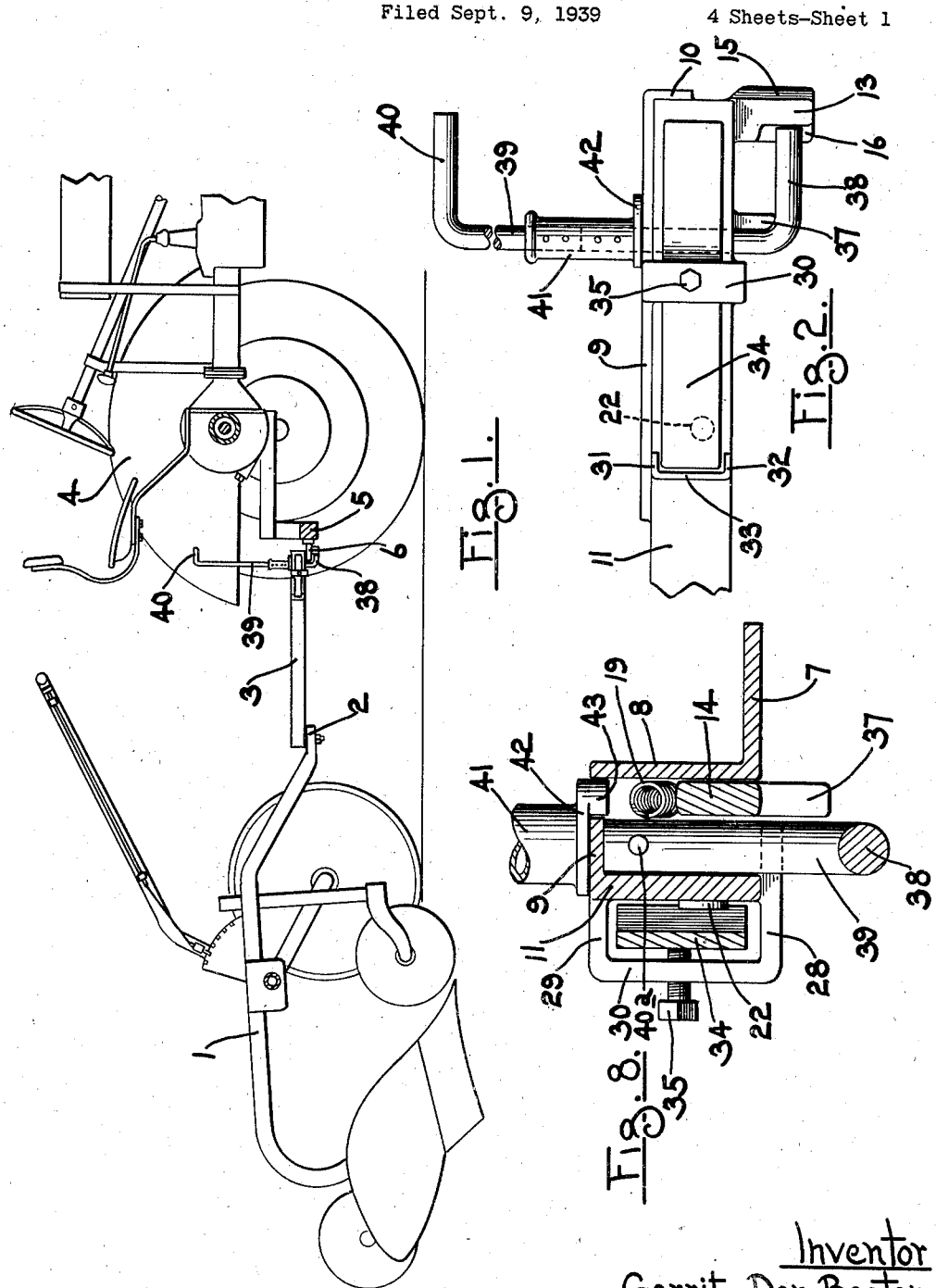
Inventor
Gerrit Den Besten
By Liverance and Van Antwerp
Attorneys

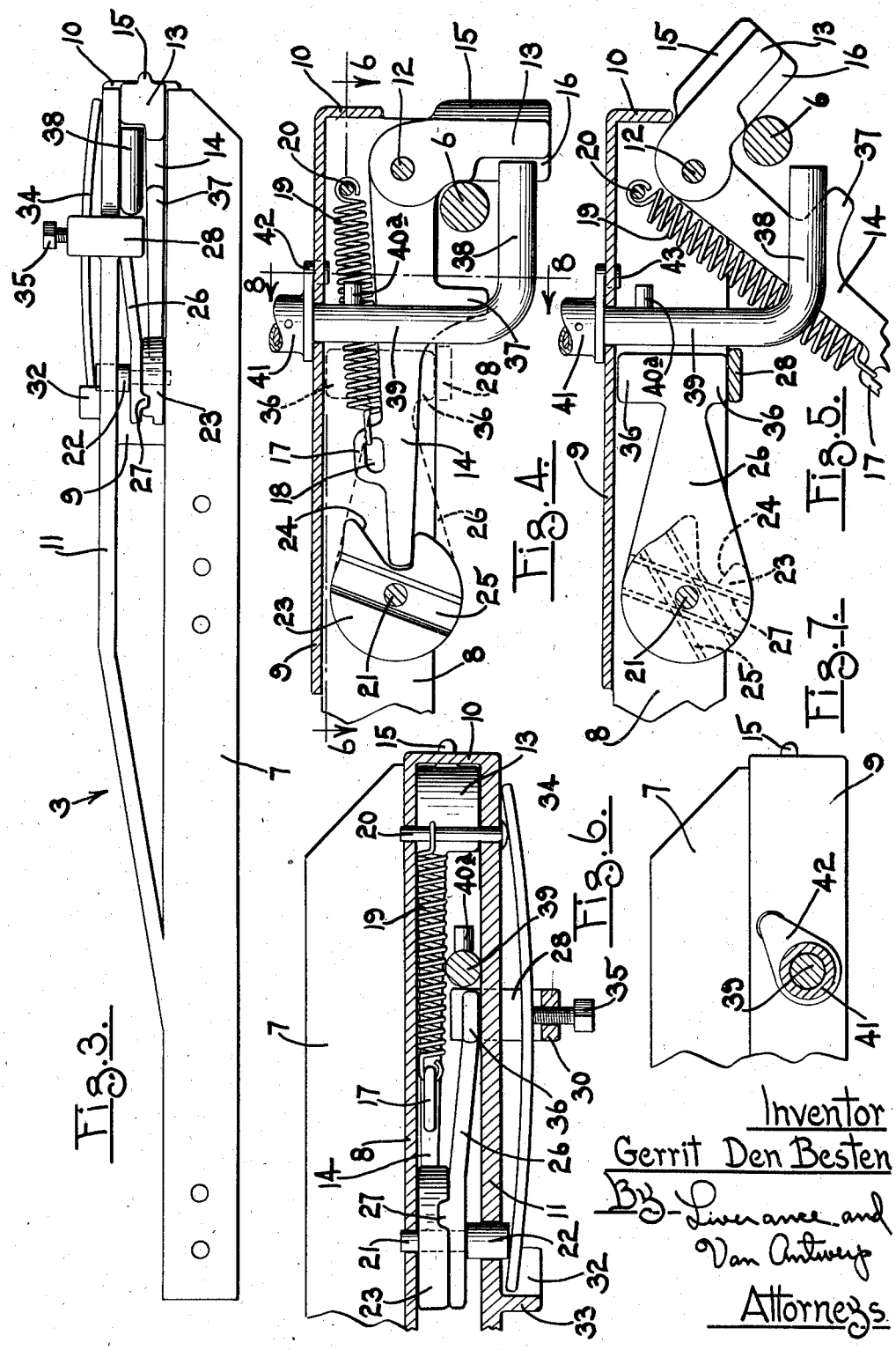

Nov. 11, 1941.　　　G. DEN BESTEN　　　2,262,452
SAFETY RELEASE HITCH
Filed Sept. 9, 1939　　　　4 Sheets-Sheet 3

Inventor
Gerrit Den Besten
By Linnance and
Van Antwerp
Attorneys

Nov. 11, 1941. G. DEN BESTEN 2,262,452
SAFETY RELEASE HITCH
Filed Sept. 9, 1939 4 Sheets-Sheet 4
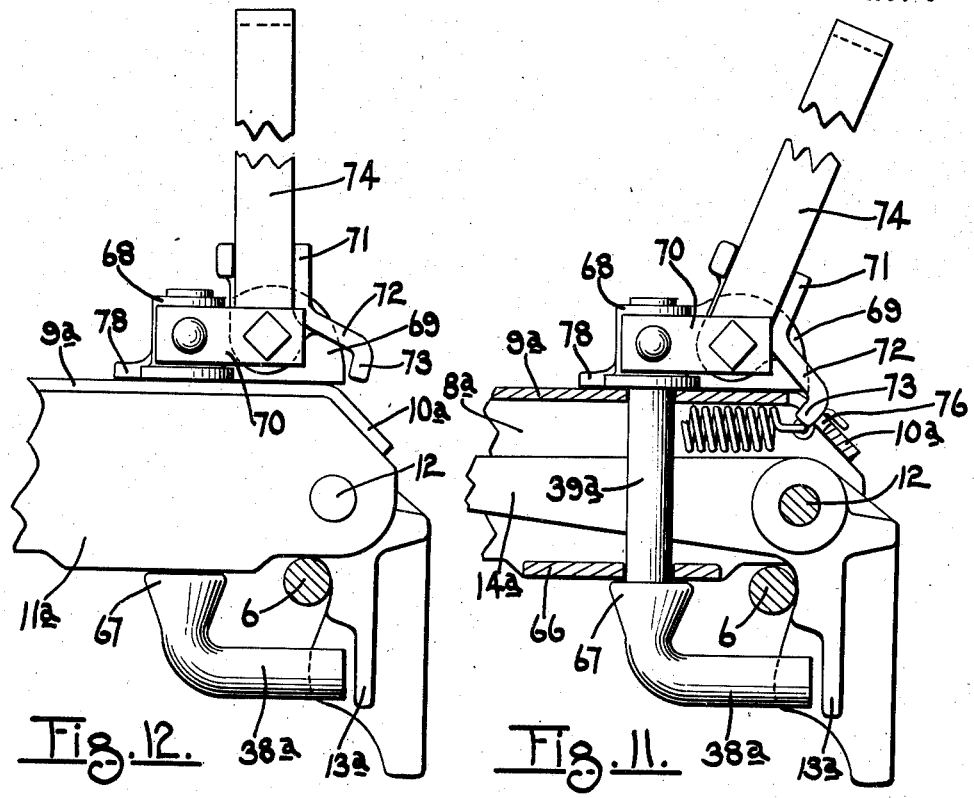
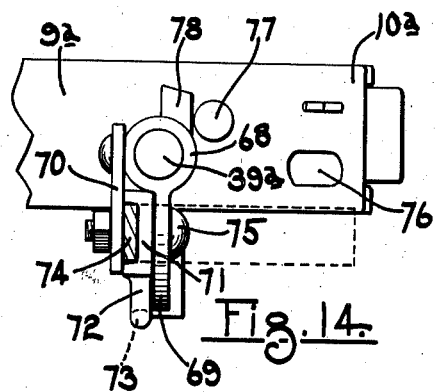
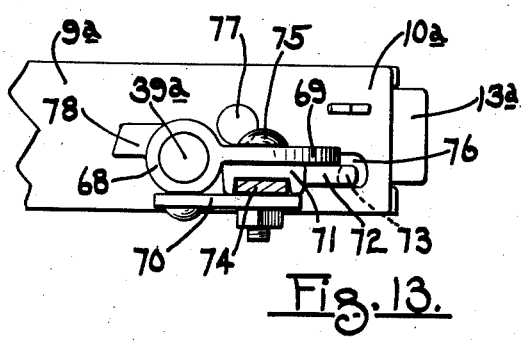
Inventor
Gerrit DenBesten
By Liverance and Van Antwerp
Attorneys Patented Nov. 11, 1941

2,262,452

UNITED STATES PATENT OFFICE 2,262,452

SAFETY RELEASE HITCH

Gerrit Den Besten, Pella, Iowa, assignor of one-fourth to Liverance & Van Antwerp, Grand Rapids, Mich., a copartnership Application September 9, 1939, Serial No. 294,050

10 Claims. (Cl. 280—33.16)

This invention relates generally to safety release hitches which are particularly adapted for use as a connection between a tractor and a drawn implement such as a plow.

It is the primary object of this invention to provide a release hitch having a pulling member secured to the tractor and a pulled member secured to the implement being drawn, so that there will be a secure connection between the two under a normal load, but which connection will be completely broken and the members will be released under an abnormal load.

A further object of the invention is to provide means to lock the members in operative position to prevent their disconnection due to any unevenness of the ground, but which may be removed from the path of the pulling member after the connection has been broken whereby the two members may be reconnected.

Other objects and purposes of the invention will appear more fully as the description proceeds.

To the accomplishment of the foregoing and related ends, said invention consists of the means hereinafter fully described and particularly pointed out in the claims.

The annexed drawings and following description set forth in detail certain means and several modes for carrying out my invention, said means constituting however, but a few of the various ways in which the principle of my invention may be employed.

In said annexed drawings, wherein like reference numerals refer to like parts throughout the various views:

Fig. 1 is a fragmentary diagrammatic elevation showing a tractor and a plow being drawn thereby, the two being connected by the hitch of my invention.

Fig. 2 is an enlarged fragmentary side elevational view of the hitch.

Fig. 3 is an under plan view thereof.

Fig. 4 is an enlarged fragmentary vertical section of my invention, taken longitudinally therethrough.

Fig. 5 is a vertical longitudinal section taken through a plane different from Fig. 4, and showing the two members about to be disconnected.

Fig. 6 is a horizontal section taken substantially on the plane of line 6—6 of Fig. 4, looking in the direction indicated by the arrows.

Fig. 7 is a fragmentary horizontal section through the locking means showing the remainder of the device in plan.

Fig. 8 is a vertical section taken substantially on the plane of line 8—8 of Fig. 4, looking in the direction indicated by the arrows.

Fig. 11 is a vertical longitudinal section showing a modification of the locking device.

Fig. 12 is a fragmentary side elevational view similar to Fig. 11, but showing the locking device in a different position.

Fig. 13 is a part sectional, part plan view of the device in Fig. 11, and

Fig. 14 is similar to Fig. 13 but showing the locking device after it has been turned through an angle of 90°.

Figure 9:
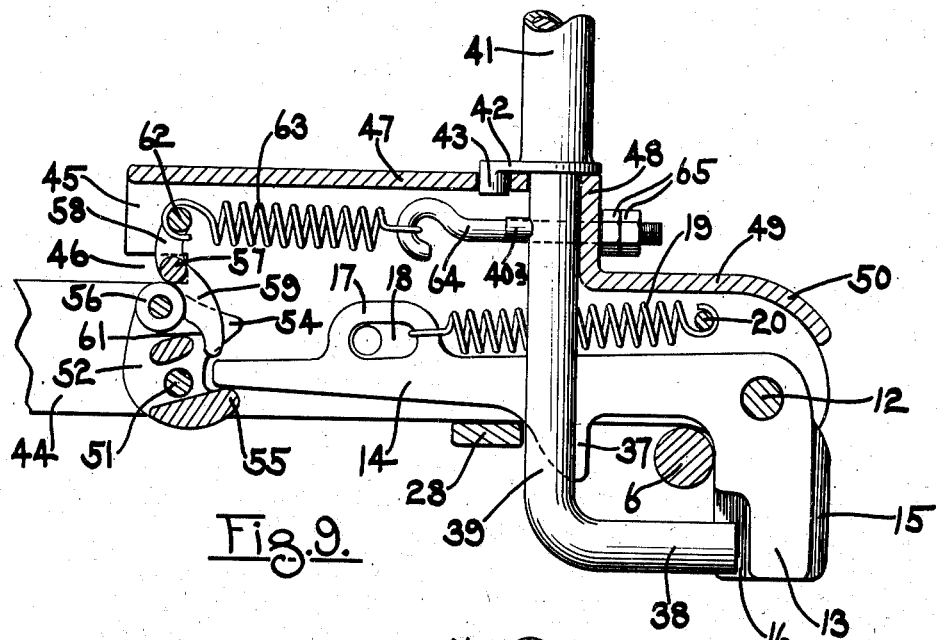
Fig. 9 is a vertical longitudinal section through the hitch showing a modification thereof.

Referring now more particularly to the drawings, Fig. 1 diagrammatically shows a plow 1 having a beam 2 at the forward end thereof, to which is connected the rear end of the release hitch 3. Ahead of the plow the tractor 4 is located which also is provided with a cross beam 5 having the clevis 6 connected thereto which is the pulling member of the tractor adapted to be connected to the hitch 3 or pulled member, whereby the tractor may draw the plow.

The body portion of the hitch 3 is made up of an angle member having a lower horizontal arm 7 and a vertical arm 8. Extending horizontally from the upper end of the vertical arm 8 and in an opposite direction from the arm 7, is located the member 9 which serves as a cover plate for the housing and which is turned at its front end downwardly to form the lip 10. A second vertical portion 11 extends downwardly from the cover plate 9 and is spaced from the vertical arm 8 of the angle member, thereby providing a housing within which the various mechanism later to be described is housed. The vertical member 11 extends rearwardly a short distance from the forward end of the device and is then bent inwardly at an angle in order to be secured to the vertical arm 8 of the angle member, as clearly shown in Fig. 3. These various portions of the housing may either be made integral or may be secured together by any desired means such as welding or the like.

A pivot pin 12 extends between the portions 8 and 11 of the housing near the forward end thereof and has pivotally mounted thereon a bell crank which is provided with a vertical arm 13 and a horizontal arm 14 forming in effect a hook. The arm or hook 13 is larger than the arm 14 and is provided with an outwardly extending vertical rib 15 at its forward side and has a cut away portion or recess 16 at its rear side. The width of the arm 13 is substantially the same as the space between the vertical portions 8 and 11 of the housing to prevent side play, and the horizontal arm 14 of the bell crank extends along the inner side of the arm 8 of the angle member.

In operation, the clevis 6 is placed behind the arm 13 of the bell crank whereby the connection is made between the pulling member 6 and the pulled member or hitch 3 to draw the implement under normal load.

Near the rearmost end of the arm 14 of the bell crank an upward extension 17 is located within which is positioned an opening 18 for the reception of one end of a tension spring 19, the other end of which is adapted to hook around the pin 20 extending between the vertical sides 8 and 11 of the housing and near the forward end thereof. After the release or disconnection of the pulling and pulled member, which forces a counter-clockwise rotation of the bell crank member, the spring 19 acts to return the bell crank to its normal operative position shown in Fig. 4.

Rearwardly of the horizontal arm 14 of the bell crank and extending between the sides 8 and 11 of the housing, is located a pivot pin 21 which is shouldered near one end thereof by the provision of an enlargement 22, which is received in an opening for that purpose in the side 11. Pivotally mounted between the shoulder of the enlargement 22 and the side 8 of the housing on the pin 21 is a substantially circular locking member 23 provided with a recess 24 extending inwardly from the periphery thereof, within which the rear end of the arm 14 on the bell crank is adapted to be received and held in that position. Across one face of the locking member 23 a slot 25 is located, the sides of which are tapered inwardly as may be easily seen in Fig. 6.

Adjacent the substantially circular locking member 23 and between it and the shoulder of the enlargement 22 the arm 26 is located which has an elongated rib 27 thereon having diverging sides adapted to fit into the slot 25. The sides of the slot 25 and the sides of the rib 27 are of the same taper and are curved at their edges so that a rotation of the locking member 23, having enough force therebehind, will disengage the rib 27 from the slot 25 to thereby permit such rotation of the locking member 23.

Extending outwardly from the side 11 of the housing is a bracket member having a lower horizontal portion 28 and an upper horizontal portion 29 connected by the vertical web 30 spaced from the portion 11 on the housing. The lower and upper members 28 and 29 of the bracket are secured by any suitable means to said side 11. Rearwardly from said bracket on the hitch and preferably integral with the side 11 of the housing is an extension outwardly therefrom in the form of a channel having upper and lower flanges 31 and 32 connected by the vertically extending web 33.

Extending longitudinally of the housing the leaf spring 34 is located which extends through the bracket and has its rearmost end located between the flanges 31 and 32 of the channel member. The forward end of the spring 34 abuts against the side 11 of the housing and the rear end thereof bears against the enlarged portion 22 on the pin 21. At substantially the center of the vertical side 30 of the bracket is located a screw threaded opening for the reception of the bolt 35, which may be screwed inwardly against the longitudinal center of the spring 34 to thereby regulate the tension thereof. It will be obvious that the force of the spring against the enlargement 22 will force the arm 26 against the bell crank locking member 23 and when the rib 27 of said arm is within the slot 25 of said locking member, there is sufficient force exerted by the spring against the two members to prevent rotation of the locking member under a normal load, thereby preventing any release of the pulled member and the pulling member. The forward end of the arm 26 is provided with vertical extensions 36, the lower one of which rests upon the inwardly extending portion of the connecting member 28 and the upper one of which terminates close to the underside of the cover plate 9. This construction of the arm 26 will prevent any rotation thereof about the pivot pin 21 when the locking member 23 is urged in a clockwise direction.

Spaced rearwardly from the arm 13 on the bell crank and integral with the arm 14 thereof is a downwardly extending portion 37 which forms a recess with the arm 13 for the reception of the clevis 6. A locking member is provided to prevent the possibility of the clevis being removed from said recess by any inadvertent means such as by unevenness of the ground over which the tractor may be traveling, which consists of a lower horizontal portion 38, an inwardly extending shaft 39 and an upper handle portion 40. An opening in the cover plate 9 is provided through which the vertical portion 39 may pass. The part 39 has vertical movement in the hole in the body and a pin 40a limits this movement. Immediately above the cover plate a shorter tubular member 41 is provided which surrounds part of the vertical portion 39 and is secured thereto. The lower portion of the tubular member 41 has integral therewith an outwardly extending plate or flange 42 which, at its outer end, is provided with a downwardly extending portion 43 adapted to fit into another opening in the plate 9 whereby any rotation of the locking member as a whole is prevented. When it is desired to rotate the portions 38, 39 and 40 of the locking member the upper handle portion 40 is grasped by the operator and raised slightly to remove the downwardly extending portion 43 from the opening in the cover plate 9, whereupon the various members are free to be rotated.

In the operation of this form of my invention the various parts are in position substantially as shown in Fig. 4, with the clevis bearing against the arm 13 of the bell crank, and the lower horizontal arm 38 of the clevis locking member in place below the clevis thereby preventing any inadvertent disconnection between the clevis and the hitch pulled thereby. As the tractor and plow move along, and the blade of the plow strikes a rock in the ground, or any other force is met which may do damage to the plow, an abnormal force will thereby be exerted by the clevis 6 against the arm 13 of the bell crank. Such force will rotate the bell crank in a counter-clockwise direction and also to cause a clockwise rotation of the locking member 23. Before the member 23 can be rotated, the rib 27 on the arm 26 must be removed from the slot 25 where it is held by the tension of the spring 34. When a sufficient abnormal load has been built up to overcome the tension of the spring 34 the rotation of the member 23 will force the arm 26 against the spring thereby removing the rib thereon from the slot 25 in the member 23. After the member 23 has rotated a sufficient distance, the abnormal pull of the clevis against the bell crank will force a counter-clockwise rotation thereof to the position shown in Fig. 5. The rotation of the bell crank is limited by means of the rib 15, the upper end of which will eventually contact the lower side of the lip 10. When this point has been reached, the additional pull by the tractor will completely disengage and remove the clevis 6 from any contact with the bell crank 13 and after the clevis has moved free of the bell crank, the spring 19 will return the bell crank to its normal position where the arm 14 thereof will strike with sufficient force against the upper edge of the recess 24 to thereby return the locking member 23 to its normal position where the recess therein will again receive the lip 27 on the arm 26.

Such a release of the pulling and pulled members will prevent any damage being done to the implement being drawn. It then merely becomes necessary for the operator to back the tractor to reconnect the various members. After the connection has been broken, the hitch together with its connections to the plow may have been dropped to the ground or to a lower position, but the operator need only grasp the elevated handle member 40 to raise the various parts to horizontal position after which the downward extension 43 on the plate 42 will have been removed from its opening to permit rotation of the members 38, 39 and 40. A rotation of such members will move the lower arm 38 out of the path which the clevis must take to be returned to its normal operative position. After the clevis has been returned, the locking member 38 will then be returned to its normal position and locked in such position whereupon the operation may continue.

Figure 10:
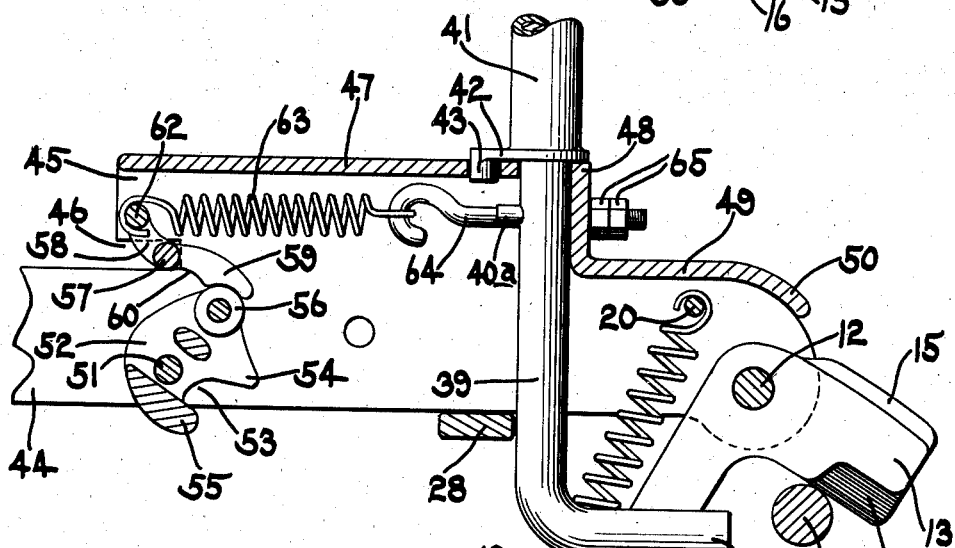
Fig. 10 is a view similar to Fig. 9 but showing the two members about to be disconnected.

Referring now more particularly to the modified form of my invention disclosed in Figs. 9 and 10, most of the elements including the clevis locking means to prevent the removal of the clevis from the recess in which it has been placed for normal load operations are the same, the modification here being specifically directed to the means which lock the bell crank in operative position to maintain it in such position until an abnormal load becomes effective thereagainst.

In this modified form of structure the vertical arm of the angle member is composed of two parts, the lower portion 44 and a shorter upper extension 45, provided with a recess 46 between the two portions thereof. The covering for the mechanism within the housing comprises a horizontal portion 47, a vertical portion 48 at the forward end thereof, and a second horizontal portion 49 extending forwardly and terminating in a downwardly curved portion 50.

Between the sides of the housing is located the pivot pin 51 which has mounted thereon the bell crank locking plate 52 which is provided at its forward edge with a recess 53 bounded at its upper side by the arm 54 and at its lower side by the arm 55. The rear end of the arm 14 on the bell crank is adapted to enter this recess and bear against the arm 55 in normal operation of the device. Near the upper edge of the locking member 52 is pivotally mounted a roller member 56. A pin 57 extends between the sides of the housing in the recess 46 and has pivotally mounted thereon the lever arm having an upper extension 58 and lower extension 59. Said lower extension at its rear edge is provided with two inwardly curved portions 60 and 61 of a radius substantially the same as that of the roller 56. The upper end of the extension 58 is provided with a pin 62 around which one end of the tension spring is adapted to hook. The forward end of said spring 63 is fastened to a hook member 64 which is secured in place by passing through an opening in the vertical portion 48 of the cover plate and is locked in such position by means of the lock nuts 65. The spring 63 requires a substantial force to extend it sufficiently to permit the movement of the lever provided with the arms or extensions 58 and 59.

During normal operation, the various parts are in position as shown in Fig. 9 where the spring 63 exerts a considerable force through the lower extension 59 against the locking member 52 by having the upper recess 60 thereof bear against the roller 56 to thereby prevent the counter-clockwise rotation of the bell crank under normal load conditions. When an abnormal load condition is reached, the clevis 6 will increase its force against the arm 13 of the bell crank until the tension of the spring 63 is overcome whereupon the bell crank will assume the position shown in Fig. 10 permitting the release of the connection between the pulling and pulled members. The locking member 52 will then have rotated through a small angle in a clockwise direction as shown in Fig. 10 until the roller 46 is received in the arcuate recess 61 of the lower extension 59. The locking member will be maintained in this position due to the force of the spring 63 acting through the lower extension 59 against the roller 56 through the pivot pin 51. After the connection between the clevis and the hitch has been completely broken, the spring 19 forces the bell crank back to its normal position where the end of the arm 14 will come against the arm 54 to thereby force the locking mechanism back into its normal position shown in Fig. 9. The operation of the locking mechanism for the clevis to permit its return to operating position within the recess of the bell crank, is then the same as hereinbefore described.

Figs. 11 to 14 inclusive disclose a modified form of lock for the clevis. Although the mechanism is still operated to rotate out of the path of the clevis when it is returned to its operative position, the means by which this rotation takes place is slightly different than the means disclosed in the other figures of the drawings. The housing is slightly changed from that heretofore described, but consists of the two vertical members 8a and 11a having a cover plate 9a thereon bent downwardly at its forward end to form the lip 10a. The bell crank is pivotally mounted on the pivot pin 12 and comprises the vertical arm 13a and the horizontal arm 14a. The device shown in this modification may be used with either of the previously described forms of the bell crank locking device.

Across the bottom of the housing and between the spaced apart sides 8a and 11a is located a plate 66 provided with an opening therein for the reception of the vertical portion 39a of the locking member, which also extends upwardly through an opening in the cover plate 9a. The horizontal portion of the lock is shown at 38a and it curves upwardly as before except that it is provided with a flared portion 67 to abut against the underside of the plate 66 to prevent any upward movement thereof. The upper end of the vertical portion 39a is provided with a flanged collar 68 adapted to rest on the cover plate 9a to prevent any downward movement thereof.

The collar 68 is provided with an arm 69 extending outwardly from substantially the center thereof. At one side of the collar 68 a supporting arm 70 is secured thereto by any suitable means. Between the arms 69 and 70 a channel member 71 is provided which has an outwardly extending portion 72 terminating in a downturned portion 73. Within the sides of the channel member 71 and the supporting arm 70 a handle 74 is positioned, and said channel member 71 and the handle 74 are pivotally mounted between the arms 69 and 70 by means of the bolt 75. The channel member 71 and the handle 74 are movable with each other.

The lip 10a is provided with an opening 76 adapted to receive the downturned end 73 to thereby prevent any rotation of the vertical portion 39a of the lock. A stop member 77 extends upwardly from the cover plate 9a adapted to cooperate with an extension 78 secured to the collar 68 to limit the rotation of the members 39a and 38a.

The normal position of the handle member is shown in Figs. 11 and 13. After the abnormal load has exerted its force sufficiently to move the bell crank and disconnect the clevis therefrom, and the bell crank has been snapped back to its normal position, the handle 74 may be grasped by the operator and moved about its pivotal point to remove the downturned portion 73 from the opening 76 as shown in Fig. 12. The mechanism is then free to be rotated until the extension 78 comes against the stop member 77 as shown in Fig. 14. At this point the horizontal portion 38a of the lock will have been turned to thereby open the recess and permit the replacement of the clevis for normal operation.

It will be obvious that either of the forms of the clevis lock as herein shown and described may be used with either of the forms of bell crank lock herein shown and described.

It will be noted that one of the outstanding features of the invention is the means for locking the clevis in pulling position and for manipulating it. The operating handle extends upwardly a considerable distance above the hitch so that it can be conveniently reached by the operator from his seat and the normal lifting movement on the handle to raise the hitch so that it may be hooked onto the clevis automatically unlatches it so that the clevis lock may be rotated to permit the clevis to be inserted. Then by turning the lock back again by means of the handle to its locking position and releasing the handle the catch which holds the lock in its locking position will automatically drop into place.

Other modes of applying the principle of my invention may be employed instead of those here explained change being made as regards the mechanism herein disclosed provided, however, that the means stated by any of the following claims or the equivalent of such stated means be employed.

I, therefore, particularly point out and distinctly claim as my invention:

1. The combination with a tractor and a drawn implement, of a release hitch comprising, a clevis connected to the tractor and a housing connected to the implement, a bell crank pivotally mounted on said housing having one of the arms thereof bearing against said clevis to form a releasable connection between said clevis and housing, a rotatable disc mounted rearwardly of said bell crank having a recess therein to receive the end of the other arm on said bell crank, a lever pivotally mounted at substantially the center thereof above said disc, a roller on said disc, arcuate recesses in the lower portion of said lever adapted to receive said roller, and spring means urging said lever against said roller preventing rotation of said disc and breaking of said connection under normal load, but permitting rotation of said disc and breaking of said connection under abnormal load.

2. The combination with a tractor and a drawn implement, of a release hitch comprising, a clevis connected to the tractor and a housing connected to the implement, means for connecting said clevis and housing together for pulling said implement under normal load, means for releasing the connection between said clevis and housing under abnormal load, a rotatable arm having a horizontal portion extending below said clevis to lock the clevis in normal position, but permitting the removal of said clevis under abnormal load, and means to hold said arm in operative position, said arm being manually movable out of operative position to permit reconnection of said clevis and housing after release thereof.

3. The combination of elements defined in claim 2, said last named means including, a collar on said arm having an outwardly extending substantially horizontal flat portion, a downwardly extending member on said flat portion, and an opening in said housing adapted to receive said member, said arm and member being raised upwardly to permit rotation thereof.

4. The combination of elements defined in claim 2, said last named means including a collar on said arm having an outwardly extending substantially vertical flat portion, a handle pivotally mounted on said flat portion, an arm extending outwardly from said handle movable therewith having a downturned portion at the outer end thereof, and an opening in said housing adapted to receive said downturned portion, said portion being removed from said opening by a pivotal movement of said handle to permit rotation thereof.

5. A safety hitch comprising a clevis attached to a tractor, a body attached to an implement, a yieldable hook connected to said body and releasably hooked onto said clevis, a lock member attached to said body serving to normally retain said clevis within said hook and movable to unlocking position, latching means to hold said lock member in operative position and a handle operatively connected to said lock member and extending above said body and serving to lift the same and automatically acting to unlatch said latching means by the effort of lifting said body.

6. A safety hitch comprising a clevis attached to a tractor, a body attached to an implement, a yieldable hook connected to said body and releasably hooked onto said clevis, a lock member mounted on said body for rotatable and limited vertical movement serving to normally retain said clevis within said hook, latching means to hold said lock member in operative position releasable by vertical movement of said locking means and a handle attached to said locking member serving to lift said body, to unlatch said latching means and to rotate said lock member to inoperative position.

7. A safety hitch comprising, a clevis attached to a tractor, a body attached to an implement, a yieldable hook connected to said body and releasably hooked onto said clevis, a lock member rotatably mounted on said body and serving to hold said clevis within said hook, latching means serving to hold said lock member in operative position and a handle connected to said lock member and to said latching means and serving to lift said body, unlatch said latching means and rotate said lock member.

8. The combination with a tractor and a drawn implement, of a release hitch comprising a clevis connected to the tractor, a housing connected to the implement, a bell crank pivotally mounted on said housing having one of the arms thereof bearing against said clevis to form a connection with the clevis and the housing, a rotatable disk mounted rearwardly of said bell crank having a recess to receive the end of the other arm on the bell crank, means to prevent rotation of said disk under normal load and to permit rotation thereof under abnormal load, thereby releasing and breaking said connection and clevis locking means located below said clevis to prevent inadvertent breaking of said connection, said means being movable out of the return path of said clevis to permit reconnection of said clevis and bell crank.

9. The combination with a tractor and a drawn implement, of a release hitch comprising a clevis connected to the tractor, a housing connected to the implement, a bell crank pivotally mounted on said housing having one of the arms thereof bearing against said clevis to form a connection with the clevis and the housing, a rotatable disk mounted rearwardly of said bell crank having a recess to receive the end of the other arm on the bell crank, a slot in said disk, a non-rotatable member adjacent said disk having a rib adapted to be received in said slot and spring means to hold said rib in said slot under normal load to prevent rotation of said disk, said rib being forced out of said slot against the force of said spring under abnormal load to permit said disk to rotate.

10. In combination with a tractor and a drawn implement, of a release hitch comprising, a pulling member connected to the tractor and a pulled member connected to the implement, means for connecting said members together for pulling said implement under normal load, said means being releasable under abnormal load, retaining means on said pulled member for preventing inadvertent disconnection of said members under normal load, said retaining means being manually movable to inoperative position, a latch to hold said retaining means in operative position and a handle mounted on said pulled member to lift the same and operatively connected to said retaining member for moving the same and automatically acting to unlatch said retaining member latch by the effort of lifting said body.

GERRIT DEN BESTEN.